(No Model.)
F. J. A. KINDERMANN.
DRIVING MECHANISM FOR VELOCIPEDES.
No. 577,621. Patented Feb. 23, 1897.
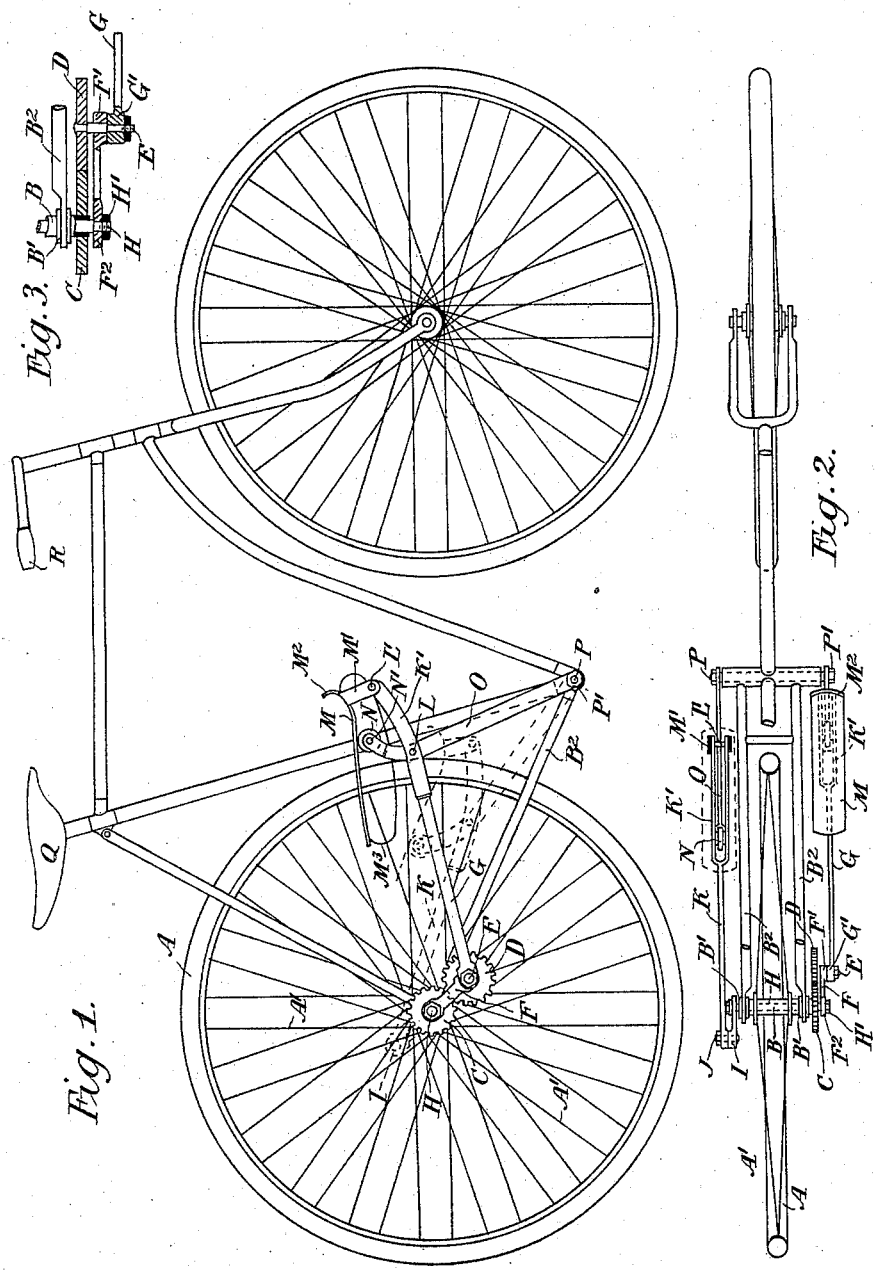
Witnesses:
Jas. A. Richmond.
C. Seiffert.
Inventor
Franz Joachim Alex. Kindermann.
by G. Sittman
Attorney.
THE NORRIS PETERS CO., PHOTO-LITHO., WASHINGTON, D. C.

UNITED STATES PATENT OFFICE.

FRANZ JOACHIM ALEXANDER KINDERMANN, OF MELBOURNE, VICTORIA.

DRIVING MECHANISM FOR VELOCIPEDES.

SPECIFICATION forming part of Letters Patent No. 577,621, dated February 23, 1897.

Application filed September 3, 1896. Serial No. 604,788. (No model.)

*To all whom it may concern:*

Be it known that I, FRANZ JOACHIM ALEXANDER KINDERMANN, a resident of Queen Street, Melbourne, in the Colony of Victoria, have invented certain new and useful Driving Mechanism for Velocipedes, of which the following is a specification.

This invention has been devised to provide improvements in and connected with the mechanism employed in the propulsion of bicycles, tricycles, and machines of that nature and to be used in place of the present chain, sprocket-wheel, and foot-crank system.

My invention by dispensing with the pedal-cranks obviates the circular movement of the feet of the rider, the action of the foot and leg being, practically speaking, similar in many respects to that of walking. Moreover, by my gear the proportionate speed of the hind or driving wheel of the machine can be easily set.

By the employment of my driving mechanism friction and weight are minimized, and the whole machine may be shortened in length.

In order that my invention may be the more easily understood, reference may be made to the accompanying drawings, in which—

Figure 1 is an elevation of a bicycle fitted with my driving mechanism; Fig. 2, a plan of same with a few portions removed for clearness of reading, while Fig. 3 is a plan in section of some of the details of Figs. 1 and 2.

In the above illustrations similar letters indicate corresponding parts.

In the drawings, A represents a bicycle-wheel the spokes A' of which radiate from a central hollow hub or sleeve B. This tubular hub B runs in bearings B', which are supported in the frame $B^2$ $B^2$ of the bicycle or similar machine. It will be noticed on Fig. 2 that this tubular hub B, after proceeding through one of the bearings B', has mounted upon it a toothed wheel C. This wheel C is rigidly attached to or made part of the said hub B, so as to revolve therewith when the wheel A is in motion and gears into a similar toothed wheel D. This latter wheel D is centered on and rigidly affixed to a crank-pin E. Said pin E passes loosely through a crank F and thence into and is rigidly secured to the head G' of a connecting-rod G. I would here point out particularly that the cogged wheel D, the crank-pin E, and the head G' are all rigidly connected to one another, but not so the crank-head F', through which the pin E merely passes and where provision must be made for lubrication. The other end $F^2$ of the crank F is rigidly connected with an axle H by a nut H'. This axle H proceeds through the hub or sleeve B to the other side of the opposite bearing B', where it is again rigidly attached to another crank I, said latter crank being preferably set at an opposite angle to the crank F. (See Fig. 2 and also as dotted in Fig. 1.) It will be here noticed that the crank I and axle H, upon which it is mounted, run independently of the hollow hub B, which surrounds H.

K is a forked connecting-rod similar in all respects to G and centered by a pin J to the crank I. Both G and K terminate in bifurcated ends K' K'. (See Figs. 1 and 2.) Through this bifurcation pins L and L' pass, the pin L, forming a joint for links M' of a pedal-plate M. This latter, M, is preferably constructed of a piece of plate metal or other material suitably shaped to receive the sole of the cyclist's boot. One end of this plate M may terminate in an elevated curve $M^2$. The under side of M is provided with a loop of metal wire $M^3$, as shown on Fig. 1. This loop $M^3$ is for the purpose of preventing the pedal-plate M from leaving its position, as shown on Fig. 1.

N is an antifriction-roller centered at N' to a bifurcated end of a rocking lever O. This latter, O, oscillates and is centered upon a bar P, kept in position at either end by lock-nuts P' P'.

The *modus operandi* of my invention may be described as follows: The cyclist sits upon the saddle Q and holds the steering-handles R in his hands in the usual way. He places each foot on its corresponding pedal-plate M, the toe of his boot pressing against the curved part $M^2$. With his right foot he downwardly presses the plate M, and thus backwardly projects the connecting-rod G, thereby pushing the crank F into rotary motion. The cogged wheel D revolves with the crank F in a circumferential line (the center of radius of which is the axle H) and synchronously causing by the thrust of its cogs or teeth the other toothed wheel C to revolve with it. As hereinbefore explained, the bicycle-wheel A, being rigidly connected by the hollow hub B to the said toothed wheel C, revolves, together with the latter. Meanwhile the downward pressure of the left foot is pulling the opposite crank I into rotation, and so by the alternating motion of the feet a constant revolution of the axle H is maintained, while the bicycle travels forward proportionately to the speed of and energy exercised by the feet of the operator. Reverting to the cogged wheels C and D illustrated on the accompanying drawings I find in practice that one complete revolution of D around the periphery of C produces two revolutions of the wheel A, and I desire to point out that by increasing the diameter of D and decreasing proportionately the diameter of C the speed of the wheel A may be increased; or, inversely, by decreasing the diameter of D and increasing that of C a slower speed of the wheel A will be adjusted.

In the accompanying drawings I have shown D as operating C through the medium of teeth or cogs; but I may in some cases construct the peripheral surfaces of C and D of leather, rubber, or other frictional material, so that they may engage with one another in lieu of the aforesaid teeth. In practice I prefer that the whole of the wearing parts of the rocking levers, connecting-rods, cranks, axle, hollow hub, and its centers should be constructed with ball-bearings.

I do not arbitrarily confine myself to a rigid adherence to the proportionate sizes of the parts illustrated upon the accompanying drawings nor to any particular materials of construction.

Having now particularly described and ascertained the nature of my said invention and in what manner the same is to be performed, I declare that what I claim is—

1. In driving mechanism for bicycles and other like machines, a frame, with a driving-wheel mounted thereon, a gear-wheel secured to the axle of said driving-wheel, a crank with axle loosely mounted in said driving-wheel axle, a wheel mounted on said crank and meshing with said gear-wheel, a connecting-rod connected with said crank, a foot-piece pivotally connected with said rod and an oscillating lever pivoted to the frame and to said rod and supporting said foot-piece, substantially as described and for the purpose set forth.

2. In driving mechanism for bicycles and the like machines—in combination the wheel C attached to the hub of the driving-wheel of the machine, a wheel D set upon a pin E and arranged to travel around and actuate the wheel C, cranks F and I, connecting-rods G and K, foot-pedals M, M and rocking lever O, said lever being provided with an antifriction-roller N substantially as and for the purposes set forth.

3. A frame with a driving-wheel thereon having a hollow axle with a gear-wheel thereon, the wheel D meshing with said gear-wheel and adapted to rotate around and actuate the same, foot-pieces having loops on their under sides, rods connected with the axle of said wheel D and pivoted to said foot-pieces and levers pivoted to said frame and to said rods and carrying antifrictional rollers bearing against said foot-pieces, substantially as and for the purpose set forth.

Signed at Melbourne, in the Colony of Victoria, this 21st day of July, 1896.

FRANZ JOACHIM ALEXANDER KINDERMANN.

Witnesses:
 A. O. SACHSE,
 A. HARKER